(12) United States Patent
Beuerle et al.

(10) Patent No.: US 11,820,350 B2
(45) Date of Patent: Nov. 21, 2023

(54) BRAKE PEDAL MODULE

(71) Applicant: ZF Active Safety GmbH, Koblenz (DE)

(72) Inventors: Christoph Beuerle, Koblenz (DE); Marcus Janson, Koblenz (DE); Peter Polke, Hanroth (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 17/868,230

(22) Filed: Jul. 19, 2022

(65) Prior Publication Data

US 2023/0033448 A1 Feb. 2, 2023

(30) Foreign Application Priority Data

Jul. 27, 2021 (DE) .......................... 102021119441.5

(51) Int. Cl.
*B60T 7/06* (2006.01)
*B60T 7/04* (2006.01)
(Continued)

(52) U.S. Cl.
CPC ............... *B60T 7/06* (2013.01); *B60T 7/042* (2013.01); *G05G 5/03* (2013.01); *B60T 2220/04* (2013.01);
(Continued)

(58) Field of Classification Search
CPC ... F16H 1/30; F16H 1/38; F16H 1/445; F16H 5/03; F16H 5/04; F16H 5/05; B60T 7/04; B60T 7/042; B60T 7/06; B60T 2220/04; B60T 2270/82; G05G 1/30; G05G 1/38; G05G 1/445; G05G 5/03; G05G 5/04; G05G 5/05
See application file for complete search history.

(56) References Cited

U.S. PATENT DOCUMENTS 6,053,205 A * 4/2000 Feldmann ................. F15B 7/08
  303/54
8,757,734 B2 * 6/2014 Toyohira ................. B60T 7/042
  303/119.3
(Continued)

FOREIGN PATENT DOCUMENTS

CN 113830058 A * 12/2021
DE 19755481 A1 6/1999
(Continued)

*Primary Examiner* — Adam D Rogers
(74) *Attorney, Agent, or Firm* — Kristin L. Murphy

(57) ABSTRACT

A brake pedal module for a "brake-by-wire" brake system of a vehicle is disclosed. The brake pedal module has a pivotably mounted brake pedal and a damping unit. The damping unit is mechanically coupled to the brake pedal in order to generate a resistance when the brake pedal is actuated. The damping unit comprises a housing and a piston mounted in the housing in such a way that it can be moved from an initial position into an end position. In its initial position, the piston is supported on a base of the housing via at least two elastic elements arranged in series. A further elastic element is arranged parallel to the at least two elastic elements on the base of the housing. The further elastic element is not subject to any load in an initial position of the piston.

18 Claims, 2 Drawing Sheets

(51) Int. Cl.

| | | |
|---|---|---|
| *G05G 1/30* | (2008.04) | |
| *G05G 5/03* | (2008.04) | |
| *G05G 5/05* | (2006.01) | |
| *G05G 1/38* | (2008.04) | |
| *G05G 1/44* | (2008.04) | |

(52) U.S. Cl.
CPC ............ *B60T 2270/82* (2013.01); *G05G 1/38* (2013.01); *G05G 1/44* (2013.01); *G05G 5/05* (2013.01)

(56) References Cited

U.S. PATENT DOCUMENTS

| | | | |
|---|---|---|---|
| 9,139,168 B2* | 9/2015 | Jeon | B60T 7/04 |
| 9,141,129 B2* | 9/2015 | Kim | G05G 5/03 |
| 10,053,073 B2* | 8/2018 | Weh | B60T 8/409 |
| 10,579,089 B2* | 3/2020 | Adoline | B60T 11/18 |
| 10,919,507 B2* | 2/2021 | Anderson | B60T 8/3255 |
| 10,948,941 B2* | 3/2021 | Dohmen | B60T 7/06 |
| 11,124,165 B2* | 9/2021 | Reuter | B60T 8/409 |
| 2011/0297493 A1* | 12/2011 | Vollert | B60T 7/042 |
| | | | 188/106 R |
| 2023/0033895 A1* | 2/2023 | Janson | B60T 7/042 |
| 2023/0034281 A1* | 2/2023 | Beuerle | B60T 7/042 |
| 2023/0036663 A1* | 2/2023 | Beuerle | B60T 8/409 |

FOREIGN PATENT DOCUMENTS

| | | |
|---|---|---|
| DE | 102017104278 A1 | 9/2018 |
| EP | 3213168 B2 | 7/2021 |
| WO | 2010081840 A1 | 7/2010 |

* cited by examiner

BRAKE PEDAL MODULE

CROSS-REFERENCE TO RELATED APPLICATION

This application claims priority to German Patent Application No. 5102021119441.5, filed Jul. 27, 2021, the disclosure of which is incorporated herein by reference in its entirety.

TECHNICAL FIELD

The disclosure relates to a brake pedal module for a "brake-by-wire" brake system of a vehicle.

BACKGROUND

In the case of "brake-by-wire" brake systems, a braking intention of a driver is detected electronically, and the brakes of the vehicle are actuated by one or more purely electric actuators. For this purpose, provision can be made for each of the brakes of the individual wheels to be assigned an electric-motor actuator, as known, for example, in the case of an "EMB" (electric-motor brake). However, provision can also be made for an electrohydraulic actuator to be activated centrally in order to actuate the brakes hydraulically in a conventional manner, as known, for example, in an "IBS" (integrated brake system). Furthermore, a "brake-by-wire" brake system can be embodied as a hybrid system in that the brakes of one vehicle axle, for example those of the front wheels, are assigned to an "IBS" and the brakes of another vehicle axle, for example those of the rear wheels, are each embodied as an "EMB".

Since in "brake-by-wire" brake systems there is generally no mechanical connection between a brake pedal and the brakes, a reaction behaviour of the brake pedal is simulated, e.g. hydraulically, for the driver. More precisely, a greater resistance acts with increasing travel when the brake pedal is actuated.

Although such hydraulic systems allow for good simulation of a reaction behaviour of the brake pedal, such systems are complicated in terms of integration into a vehicle environment.

SUMMARY

What is needed is to provide a brake pedal module which can be integrated easily into a vehicle installation space and at the same time can simulate a reaction behaviour of the brake pedal in the best possible manner.

According to the disclosure, a brake pedal module for a "brake-by-wire" brake system of a vehicle, having a pivotably mounted brake pedal and having a damping unit, which is mechanically coupled to the brake pedal in order to generate a resistance when the brake pedal is actuated. The damping unit comprises a housing and a piston mounted in the housing in such a way that it can be moved from an initial position into an end position. In its initial position, the piston is supported on a base of the housing via at least two elastic elements arranged in series, and wherein a further elastic element is arranged parallel to the at least two elastic elements on the base of the housing, wherein the further elastic element is not subject to any load in an initial position of the piston.

In other words, a contact surface of the further elastic element on the base of the housing is unaffected in the initial position of the piston, that is to say there are also no further elastic elements supported on the elastic element. In the initial position, the piston is also not supported on the further elastic element.

The contact surface of the further elastic element is the surface which is directed towards the piston, that is to say the surface which can come into contact with the piston when the piston is moved.

The piston is in its initial position when there is no actuation of the brake pedal, and in an end position when the brake pedal is depressed to the maximum extent.

A particularly advantageous pedal characteristic can be achieved by the arrangement of the elastic elements in accordance with the disclosure. The pedal characteristic designates a resistance which a driver perceives as a function of a braking travel when the brake pedal is actuated.

More precisely, the two elastic elements arranged in series generate a counterforce during a movement of the piston, which counterforce is perceived by a driver at the brake pedal as a resistance.

The elastic element which is arranged on the base of the housing does not influence the resistance perceived at the brake pedal at the beginning of a braking operation.

The further elastic element on the base of the housing is a rubber damper, for example. Such dampers are particularly compact.

In one exemplary arrangement, the rubber damper is conical. As a result, a force required to compress the damper in the axial direction rises exponentially. Correspondingly, a resistance at the brake pedal perceived by a driver rises rapidly when the rubber damper is compressed by the piston.

According to one exemplary arrangement, the piston is spaced apart axially from the further elastic element in its initial position. The further elastic element thus contributes to a reaction behaviour of the brake pedal only when the piston has traversed the axial distance to the elastic element.

The piston rests directly against the further elastic element in its end position and before reaching its end position. For example, the piston rests against the further elastic element in the last third of the actuating path. The further elastic element thus contributes to a reaction behaviour of the brake pedal when a driver depresses the brake pedal to a great extent.

The elastic element of the elastic elements arranged in series which is first when considered in the actuating direction of the piston and from the piston preferably has a lower spring stiffness than the at least one further one of the elastic elements arranged in series. This has the advantage that a braking intention is detected quickly. In particular, a driver only has to apply a small force to move the brake pedal out of its unactuated position.

The actuating direction of the piston is the direction from its initial position into its end position.

In one exemplary arrangement, the elastic element with the greater spring stiffness is a spring with a progressive spring characteristic curve. A spring of this kind has a non-linear characteristic curve. To be more precise, a progressive spring is relatively soft when subjected to little force and becomes harder when subjected to increasing load.

According to one exemplary arrangement, the two elastic elements arranged in series are supported on one another via a supporting element, in particular wherein the two elastic elements rest against opposite ends of the supporting element. Owing to the contact with the supporting element, both elastic elements have a stable contact surface.

In one exemplary arrangement, there is a contact surface for the piston on the supporting element, wherein the elastic element which is first when considered in the actuating direction is bridged as soon as the piston rests against the bearing surface. As soon as the first elastic element is then bridged, only the second elastic element acts initially, at least until the piston reaches the further elastic element on the base of the housing. Thus, a reaction behaviour of the brake pedal can be simulated in ranges by a single elastic element.

In one exemplary arrangement, the at least two elastic elements arranged in series are helical springs. Helical springs are inexpensive and easily available.

According to one exemplary arrangement, the piston is non-rotatably mounted. The non-rotatable mounting is achieved, for example, by virtue of the fact that the piston and the housing have a non-circular cross section. The non-rotatable mounting of the piston permits particularly reliable detection of the movement path of the piston.

In one exemplary arrangement, the damping unit is pneumatically self-contained. For example, the housing is pneumatically self-contained. A particular advantage here is that there are no fluid connections on the damping unit or no fluid lines need to be connected to the damping unit. Thus, the brake pedal module can be manufactured as a separate unit and positioned in an installation space environment independently of other components or fluid lines.

Moreover, the damping unit can be particularly compact as a result.

According to one exemplary arrangement, the brake pedal module comprises a sensor unit for detecting a braking intention of a driver. For example, a braking intention is detected electronically. Based on the detected braking intention, a signal can be forwarded to the actuators assigned to the wheels, which then generate a braking effect.

The brake pedal module according to the disclosure is suitable for use in a "brake-by-wire" brake system, which is equipped with "EMB" brakes and/or is designed as an "IBS" system.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
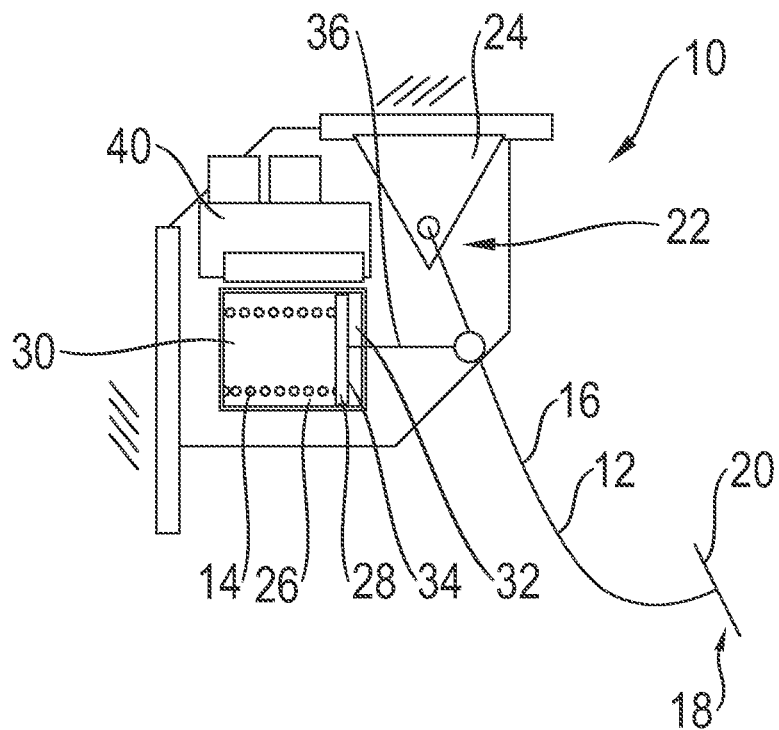
FIG. 1 shows schematically a brake pedal module according to the disclosure.

FIG. 1 shows schematically a brake pedal module 10 for a "brake-by-wire" brake system of a vehicle.

In particular, the brake pedal module 10 serves to electronically detect a braking intention of a driver.

The brake pedal module 10 comprises a pivotably mounted brake pedal 12 and a damping unit 14, which is mechanically coupled to the brake pedal 12.

The damping unit 14 is used to generate a resistance when the brake pedal 12 is actuated.

In the exemplary arrangement, the damping unit 14 is subjected to compression. In an alternative arrangement, however, the damping unit can also be subjected to tension.

The brake pedal 12 is formed by a strut 16.

At a first end 18, the strut 16 has an actuating surface 20, which can be pressed by a driver to signal a braking intention. In other words, a driver can exert a pressure on the actuating surface 20 with the foot to signal a braking intention.

At an end 22 opposite the first end 18, the strut 16 is pivotably suspended on a bearing 24 fixed with respect to the vehicle.

The damping unit 14 is likewise mounted in a manner fixed with respect to the vehicle, in particular being screwed to a body part.

The damping unit 14 is mechanically coupled to the brake pedal 12 between the ends 18, 22.

The damping unit 14 comprises a housing 26, in which a piston 28 is accommodated and movably mounted.

The piston 28 divides the housing 26 into a pressure chamber 30 and a vacuum chamber 32.

A piston rod 36 extends from an end 34 of the piston 28.

The piston 28 is coupled to the brake pedal 12 via the piston rod 36. Optionally, an intermediate piece 37 (see FIG. 2) can be provided between the piston rod 36 and the brake pedal 12.

The brake pedal module 10 furthermore comprises a sensor unit 40 for detecting a braking intention of a driver.

The sensor unit 40 detects a movement path of the piston 28.

The damping unit 14 will be described in detail with reference to FIG. 2.

The damping unit 14 comprises a plurality of elastic elements 42, 43, 44.

Two of the elastic elements 42, 43 are arranged in series, in particular between a base 46 of the housing 26 and the piston 28.

To be more precise, the piston 28 is supported in its initial position on the base 46 of the housing 26 via the two elastic elements 42, 43 arranged in series.

The two elastic elements 42, 43 arranged in series are supported on one another via a supporting element 48.

To be more precise, the two elastic elements 42, 43 rest against opposite ends of the supporting element 48.

The supporting element 48 is shaped in such a way that it forms a guide for the elastic elements 42, 43, at least in some section or sections.

As a result, the elastic elements 42, 43 are arranged so as to overlap in the axial direction in some section or sections.

In exemplary arrangement, the supporting element 48 has a depression 52 on an end 50 directed towards the piston 28, in which a depression section of the elastic element 42 arranged between the supporting element 48 and the piston 28 is accommodated.

The piston 28 likewise has a depression 53 in which the elastic element 42 is accommodated.

On the opposite end 54 of the supporting element 48 there is a step 56, on which the elastic element 43 arranged between the supporting element 48 and the base 46 is supported.

In addition, there is on the base 46 a depression 57 in which a section of the elastic element 43 is accommodated in order to ensure stable positioning of the elastic element 43.

There is a contact surface 58 for the piston 28 on the supporting element 48, for example, on the end 50 directed towards the piston 28.

In its initial position, the piston 28 is spaced apart axially from the contact surface 58. To be more precise, the piston 28 has a contact surface 60 which, when considered in the direction of movement of the piston 28, overlaps with the contact surface 58 on the supporting element 48, the bearing surfaces 58, 60 being spaced apart axially from one another.

With increasing actuation of the brake pedal 12, the piston 28, in particular the contact surface 60 of the piston 28, approaches contact surface 58 and finally comes to rest against contact surface 58. When this state has been reached, the elastic element 42 which is first when considered in the actuating direction is bridged.

As an option, the piston 28 can have a guide section 62 surrounding the contact surface 60 of the piston 28. In the exemplary arrangement, the guide section 62 is a collar which extends axially starting from contact surface 60 and on which a running surface 64 of the piston 28 is formed.

In the exemplary arrangement, the two elastic elements 42, 43 arranged in series are helical springs.

The elastic element 42 of the elastic elements 42, 43 arranged in series which is first when considered in the actuating direction of the piston 28 and from the piston 28 has a lower spring stiffness than the further one of the elastic elements arranged in series.

Moreover, the elastic element 42 which is first when considered in the actuating direction of the piston 28 has a smaller diameter than the further one of the elastic elements 43 arranged in series.

The two elastic elements 42, 43 are arranged concentrically with one another.

The elastic element 43 with the greater spring stiffness is a spring with a progressive spring characteristic curve.

In the exemplary arrangement, only two elastic elements 42, 43 arranged in series are illustrated. However, it is also possible to arrange more than two elastic elements in series, the axially successive elastic elements each being supported on one another via a supporting element.

The two elastic elements 42, 43 arranged in series serve to generate a resistance which is perceived by a driver when the brake pedal 12 is actuated.

Furthermore, the elastic elements 42, 43 arranged in series serve as return elements in order to move the piston 28 back into its initial position or to hold it in the initial position when the brake pedal 12 is not actuated.

In addition to the elastic elements 42, 43 arranged in series, a further elastic element 44 is arranged parallel to the at least two elastic elements 42, 43, to be precise on the base 46 of the housing 26.

For easier positioning, a receptacle 66 for the elastic element 44 is formed on the base 46.

The elastic element 44 on the base 46 of the housing 26 is a rubber damper.

In the exemplary arrangement, the rubber damper is conical, wherein the rubber damper tapers towards the piston 28.

Figure 2:
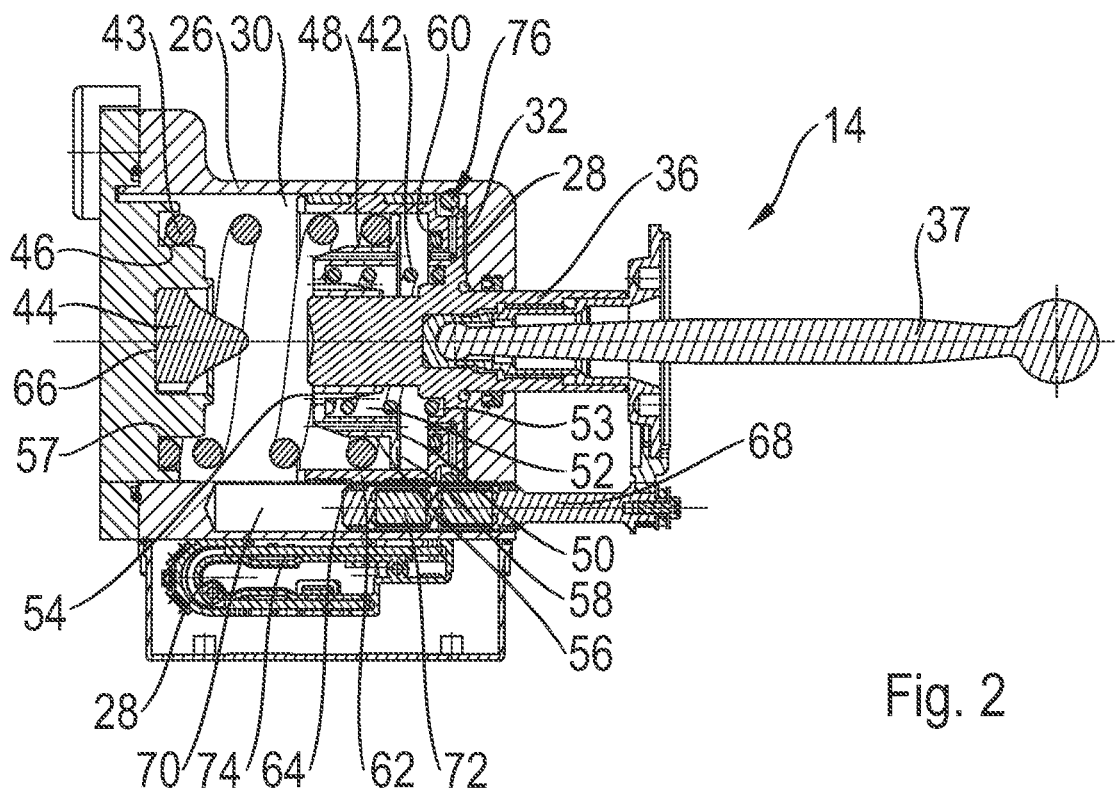
FIG. 2 shows a longitudinal section through a damping unit of a brake pedal module according to the disclosure.

The further elastic element 44 is not subject to a load in an initial position of the piston 28, as can be seen in FIG. 2.

In its initial position, the piston 28 is spaced apart, in particular axially, from the elastic element 44.

This means that the piston 28 does not touch the elastic element 44 in its initial position.

In its end position and before reaching its end position, however, the piston 28 rests directly against the further elastic element 44, in particular in the last third of its actuating path.

Thus, in the last section of the actuating path of the piston 28, the elastic element 44 designed as a rubber damper contributes to damping the piston movement.

In the exemplary arrangement illustrated in FIG. 2, the sensor unit 40 comprises a slide 68, which is fixedly coupled to the piston 28 and runs laterally on the housing 26 in a guide 70. Magnets 72 are integrated into the slide 68, and their movement is detected by one or more sensor elements 74.

In an alternative arrangement, a magnet can be secured directly on the piston 28.

The piston 28 can be non-rotatably mounted in the housing 26. For example, the piston 28 and the housing 26 have a non-circular cross section.

This is advantageous, in particular, if, in an alternative arrangement, the magnet is secured directly on the piston 28. In this case, the distance between the magnet and the sensor elements can be particularly short, thereby making it possible to detect a movement path in a particularly reliable manner.

The damping unit 14 is pneumatically self-contained.

However, there is a flow connection between the pressure chamber 30 and the vacuum chamber 32.

The flow connection is implemented by a restrictor 76, which is integrated into the piston 28.

The restrictor 76 is designed in such a way that it restricts an air flow from the pressure chamber 30 into the vacuum chamber 32 when the brake pedal 12 is actuated more than an air flow from the vacuum chamber 32 into the pressure chamber 30 when the brake pedal 12 is reset.

Figure 3:
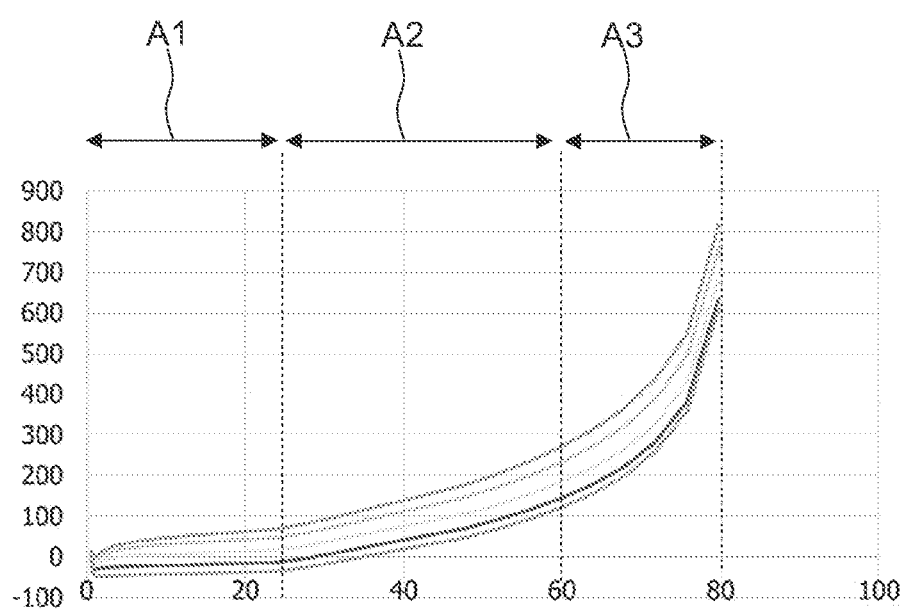
FIG. 3 shows a characteristic curve of a pedal characteristic of a brake pedal module according to the disclosure.

FIG. 3 shows a pedal characteristic of the brake pedal module 10.

In the diagram illustrated in FIG. 3, an actuating force (in newtons) which a driver applies to the brake pedal 12 is illustrated against a pedal travel (in millimetres).

It is apparent from FIG. 3 that, at the beginning of a braking operation, only a small force has to be applied by a driver to move the brake pedal 12 out of its initial position.

As the travel increases, however, the required force becomes greater.

The pedal characteristic can be subdivided into three sections A1, A2, A3.

In the first section A1, the pedal characteristic is influenced almost exclusively by the first elastic element 42 with the lower spring strength.

The first section A1 forms a piston movement from the initial position of the piston 28 to the piston position in which the piston 28 rests against the supporting element 48 and the first elastic element 42 is bridged.

Since the first elastic element 42 can be compressed relatively easily in the first section A1 because of its low spring strength, the required actuating force hardly rises in the first section.

The first section A1 corresponds to a travel of about 25 mm, for example.

In the second section A2, the pedal characteristic is determined by elastic element 43.

The required actuating force for moving the brake pedal 12 or for moving the piston 28 consequently rises in the second section.

The second section A2 represents a piston movement from a position in which the first elastic element 42 is bridged to a position in which the piston 28 touches the further elastic element 44 on the base 46 of the housing 26.

The second section A2 corresponds to a travel of about 25 mm to 60 mm, for example.

In the third section A3, the second elastic element 43 and the further elastic element 44 arranged on the base 46 of the housing 26 act in parallel.

As a result, a required actuating force in the third section A3 rises exponentially.

In the diagram in FIG. 3, several curves are plotted, each representing a force progression at different actuating speeds. The actuating speed is the speed at which a driver depresses the brake pedal 12.

The faster the driver moves the brake pedal, the greater the resistance felt. This is related to the damping of the piston movement by the restrictor 76. The faster the piston 28 is moved, the greater the damping of the piston by the restrictor 76.

The invention claimed is:

1. A brake pedal module for a brake-by-wire brake system of a vehicle, comprising a pivotably mounted brake pedal and a damping unit, wherein the damping unit is mechanically coupled to the brake pedal in order to generate a resistance when the brake pedal is actuated, wherein the damping unit comprises a housing and a piston mounted in the housing in such a way that the piston moves from an initial position to an end position, wherein, in the initial position, the piston is supported on a base of the housing via at least two elastic elements arranged in series, and wherein a further elastic element is arranged parallel to the at least two elastic elements on the base of the housing, wherein the further elastic element is not subject to any load when the piston is in the initial position, wherein the at least two elastic elements arranged in series are supported on one another via a supporting element, a first elastic element of the at least two elastic elements disposed over and in contact with an outer surface of the supporting element and a second elastic element of the at least two elastic elements disposed within and in contact with an inner surface of the supporting element, wherein the first elastic element and the second elastic element at least partially overlap when the piston is disposed in the initial position, wherein, in its end position and before reaching its end position, the piston rests directly against the further elastic element.

2. A brake pedal module according to claim 1, wherein the further elastic element on the base of the housing is a rubber damper.

3. A brake pedal module according to claim 2, wherein the rubber damper is conical.

4. A brake pedal module according to claim 2, wherein, in its initial position, the piston is spaced apart axially from the further elastic element.

5. A brake pedal module according to claim 4, wherein, in its end position and before reaching its end position, the piston rests directly against the further elastic element.

6. A brake pedal module according to claim 5, wherein the first elastic element comprises a lower spring stiffness than the second elastic element.

7. A brake pedal module according to claim 6, wherein the at least two elastic elements arranged in series are helical springs.

8. A brake pedal module according to claim 7, wherein the piston is non-rotatably mounted.

9. A brake pedal module according to claim 8, wherein the brake pedal module comprises a sensor unit for detecting actuation of the brake pedal of the brake pedal module.

10. A brake pedal module according to claim 1, wherein, in its initial position, the piston is spaced apart axially from the further elastic element.

11. A brake pedal module according to claim 1, wherein the first elastic element of the at least two elastic elements arranged in series comprises a lower spring stiffness than the second elastic element.

12. A brake pedal module according to claim 11, wherein the elastic element with the greater spring stiffness is a spring with a progressive spring characteristic curve.

13. A brake pedal module according to claim 1, wherein the supporting element comprises a contact surface for the piston, wherein the first elastic element is bridged when the piston rests against the contact surface.

14. A brake pedal module according to claim 1, wherein the at least two elastic elements arranged in series are helical springs.

15. A brake pedal module according to claim 1, wherein the piston is non-rotatably mounted.

16. A brake pedal module according to claim 1, wherein the damping unit is pneumatically self-contained.

17. A brake pedal module according to claim 1, wherein the brake pedal module comprises a sensor unit for detecting actuation of the brake pedal of the brake pedal module.

18. A brake pedal module for a brake-by-wire brake system of a vehicle, comprising a pivotably mounted brake pedal and a damping unit, wherein the damping unit is mechanically coupled to the brake pedal in order to generate a resistance when the brake pedal is actuated, wherein the damping unit comprises a housing and a piston mounted in the housing in such a way that the piston moves from an initial position to an end position, wherein, in the initial position, the piston is supported on a base of the housing via at least two elastic elements arranged in series, and wherein a further elastic element is arranged parallel to the at least two elastic elements on the base of the housing, wherein the further elastic element is not subject to any load when the piston is in the initial position, wherein the at least two elastic elements arranged in series are supported on one another via a supporting element, a first elastic element of the at least two elastic elements disposed over and in contact with an outer surface of the supporting element and a second elastic element of the at least two elastic elements disposed within and in contact with an inner surface of the supporting element, wherein the first elastic element and the second elastic element at least partially overlap when the piston is disposed in the initial position, wherein the further elastic element on the base of the housing is a rubber damper, wherein, in its initial position, the piston is spaced apart axially from the further elastic element, wherein, in its end position and before reaching its end position, the piston rests directly against the further elastic element.

* * * * *